United States Patent
Lee (10) Patent No.: US 8,331,944 B2
(45) Date of Patent: Dec. 11, 2012

(54) MOBILE COMMUNICATION METHOD, STORAGE MEDIUM FOR STORING THEREOF AND MOBILE COMMUNICATION SYSTEM

(75) Inventor: Kun-Hung Lee, Taipei (TW)

(73) Assignee: Institute for Information Industry, Taipei (TW)

(*) Notice: Subject to any disclaimer, the term of this patent is extended or adjusted under 35 U.S.C. 154(b) by 483 days.

(21) Appl. No.: 12/630,154

(22) Filed: Dec. 3, 2009

(65) Prior Publication Data

US 2011/0098032 A1    Apr. 28, 2011

(30) Foreign Application Priority Data

Oct. 26, 2009    (TW) .............................. 98136199 A (51) Int. Cl.
*H04W 36/00* (2009.01)
*H04W 4/00* (2009.01)

(52) U.S. Cl. ............ 455/443; 455/444; 455/435.1; 455/436; 455/437; 455/439; 370/331

(58) Field of Classification Search ............ 455/443, 455/444, 435.1, 436, 437, 438, 439; 370/331
See application file for complete search history.

(56) References Cited

U.S. PATENT DOCUMENTS

| | | | |
|---|---|---|---|
| 2007/0082656 A1* | 4/2007 | Stieglitz et al. | 455/411 |
| 2007/0097938 A1* | 5/2007 | Nylander et al. | 370/338 |
| 2007/0232307 A1* | 10/2007 | Ibrahim et al. | 455/436 |
| 2010/0190496 A1* | 7/2010 | Chinnathambi | 455/435.1 |
| 2010/0216469 A1* | 8/2010 | Yi et al. | 455/435.3 |
| 2012/0039195 A1* | 2/2012 | Jung et al. | 370/252 |

* cited by examiner

*Primary Examiner* — Kamran Afshar
*Assistant Examiner* — Omoniyi Obayanju
(74) *Attorney, Agent, or Firm* — McClure, Qualey & Rodack, LLP (57) ABSTRACT

A mobile communication method includes the following steps: several first base stations and at least one second base station are provided. Wherein, each of the first base stations can cover a smaller area than the second base station can. A registration signal is received from a mobile communication device. If the registration signal is received through one of the first base stations, service is provided to the mobile communication device through the first base station receiving the registration signal, and a first base station list, which includes information of the first base stations, is transmitted to the mobile communication device. The mobile communication device measures signal strength of the first base stations according to the first base station list. The mobile communication device transmits another registration signal to the first base station with the strongest measured signal strength.

18 Claims, 5 Drawing Sheets

MOBILE COMMUNICATION METHOD, STORAGE MEDIUM FOR STORING THEREOF AND MOBILE COMMUNICATION SYSTEM

RELATED APPLICATIONS

This application claims priority to Taiwan Application Serial Number 98136199, filed Oct. 26, 2009, which is herein incorporated by reference.

BACKGROUND

1. Technical Field

The present invention relates to a communication method, storage medium for storing thereof and a communication system. More particularly, the present invention relates to a mobile communication method, storage medium for storing thereof and a mobile communication system.

2. Description of Related Art

A cellular network is a radio network made up of a number of radio cells (or just cells) each served by at least one fixed-location transceiver known as a cell site or base station. A Macrocell is a cell that provides radio coverage served by a power cellular base station (tower). However, it's difficult to for Macrocells to provide good indoor radio coverage. Therefore, Femtocells are used to provide indoor coverage.

Femtocells—originally known as an Access Point Base Stations—are small cellular base stations, typically designed for use in a home or small business. It connects to the service provider's network via broadband (such as DSL or cable). Femtocells typically support two to four active mobile communication devices (such as mobile phones) in a residential setting. Femtocells allow service providers to extend service coverage indoors, especially where access would otherwise be limited or unavailable.

In prior art, if several base stations are candidates to provide service to a mobile communication device, the mobile communication device may obtain service according to signal strength of all candidate base stations measured by the mobile communication device itself. Since Macrocells generate much stronger signals than Femtocells, the mobile communication device may switch between Femtocells and Macrocells if the Femtocell and Macrocell are both candidates to provide a service.

SUMMARY

According to one embodiment of this invention, a mobile communication method is provided. The mobile communication method includes the following steps: several first base stations and at least one second base station are provided. Wherein, each of the first base stations can cover a smaller area than the second base station can. A registration signal is received from a mobile communication device. If the registration signal is received through one of the first base stations, service is provided to the mobile communication device through the first base station receiving the registration signal, and a first base station list, which includes information of the first base stations, is transmitted to the mobile communication. The mobile communication device measures signal strength of the first base stations according to the first base station list. The mobile communication device transmits another registration signal to the first base station with the strongest measured signal strength.

According to another embodiment of this invention, a mobile communication system is provided. The mobile communication system includes several first base stations, at least a second base station and a mobile communication management platform. Each of the first base stations can cover a smaller area than the second base station can. The mobile communication management platform builds connections with the first base stations and the second base station respectively. The mobile communication management platform includes a first list-transmitting module and a first registration module. If a registration signal is received from a mobile communication device through one of the first base stations, the first list-transmitting module provides service to the mobile communication device through the first base station receiving the registration signal, and transmits a first base station list, which includes information of the first base stations, to the mobile communication device. The first registration module makes the mobile communication device measure signal strength of the first base stations according to the first base station list, and makes the mobile communication device transmit another registration signal to the first base station with the strongest measured signal strength.

According to another embodiment of this invention, a storage medium to store several instructions to execute a mobile communication method is provided. The mobile communication method includes the following steps: several first base stations and at least one second base station are provided. Wherein, each of the first base stations can cover a smaller area than the second base station can. A registration signal is received from a mobile communication device. If the registration signal is received through one of the first base stations, service is provided to the mobile communication device through the first base station receiving the registration signal, and a first base station list, which includes information of the first base stations, is transmitted to the mobile communication. The mobile communication device measures signal strength of the first base stations according to the first base station list. The mobile communication device transmits another registration signal to the first base station with the strongest measured signal strength.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
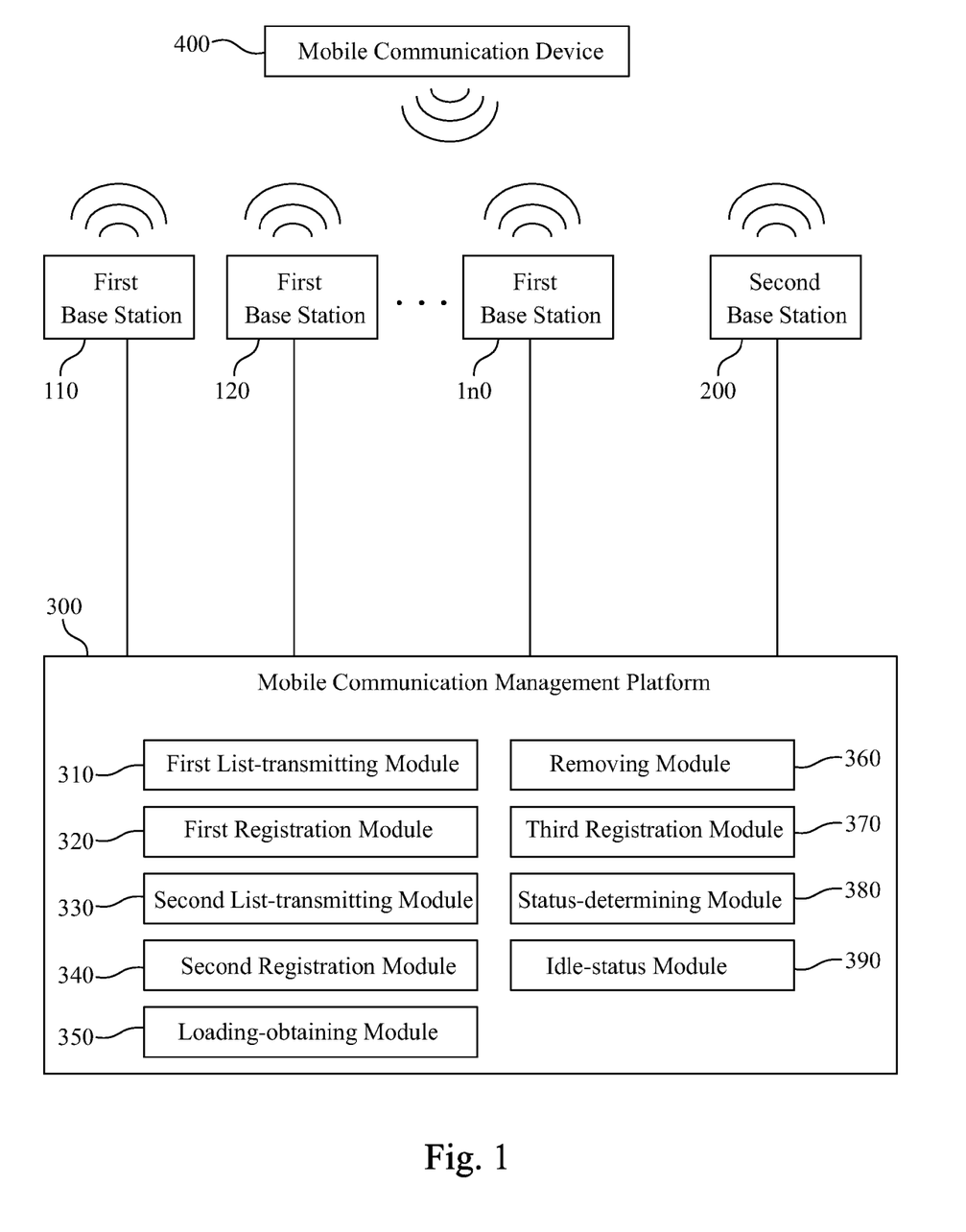
FIG. 1 is a block diagram of a mobile communication system according to one embodiment of this invention.

FIG. 1 is a block diagram of a mobile communication system according to one embodiment of this invention. The mobile communication system provides several first base stations with smaller coverage and at least one second base station with larger coverage. When a mobile communication device registers with one of the first base stations, information of the first base stations are provided to the mobile communication device to measure signal strength of the first base stations and select a service provider for the mobile communication device from the first base stations.

Refer to FIG. 1. The mobile communication system includes several first base stations 110, 120, . . . and 1n0, at least a second base station 200 and a mobile communication management platform 300. Each of the first base stations 110, 120, . . . and 1n0 can cover smaller areas than the second base station can. The mobile communication management platform 300 builds connections with the first base stations 110, 120, . . . and 1n0 and the second base station 200. If the mobile communication system is implemented under $3^{rd}$ Generation (3G) network, the first base stations 110, 120, . . . and 1n0 may be Femtocells, the second base station 200 may be a Macrocell, and the mobile communication management platform 300 may be a Mobile Switching Center (MSC). In another embodiment, the mobile communication management platform 300 may be installed discretely on the first base stations 110, 120, . . . and 1n0 and the second base station 200. In other embodiments, the mobile communication management platform 300 may be installed on other types of mobile communication management platforms, which should not be limited in this embodiment.

The mobile communication management platform 300 includes a first list-transmitting module 310 and a first registration module 320. When a registration signal is received from a mobile communication device 400 through one of the first base stations 110, 120, . . . and 1n0, the first list-transmitting module 310 provides service to the mobile communication device 400 through the first base station receiving the registration signal, and transmits a first base station list, which includes information of the first base stations 110, 120, . . . and 1n0, to the mobile communication device 400. The first list-transmitting module 310 may utilize System Information Block (SIB) 11 transmits the first base station list to the mobile communication device 400. The first registration module 320 makes the mobile communication device 400 measure signal strength of the first base stations 110, 120, . . . and 1n0 according to the first base station list, and makes the mobile communication device 400 transmit another registration signal to a base station with the strongest measured signal strength among the first base stations 110, 120, . . . and 1n0. Then, the mobile communication device 400 can obtain service from the base station receiving another registration signal. In addition, the first registration module 320 may determine if the first base station receiving the registration signal is the same as the base station with the strongest measured signal strength among the first base stations 110, 120, . . . and 1n0. If the first base station receiving the registration signal is the same as the base station with the strongest measured signal strength among the first base stations 110, 120, . . . and 1n0, the first station receiving the registration signal continually provides service to the mobile communication device 400. If the first base station which receives the registration signal is different from the base station with the strongest measured signal strength among the first base stations 110, 120, . . . and 1n0, the first registration module 320 makes the mobile communication device 400 transmit another registration signal to the base station with the strongest measured signal strength among the first base stations 110, 120, . . . and 1n0. Therefore, the mobile communication device 400 would not switch to the second base station 200 easily once the mobile communication device 400 registers with one of the first base stations 110, 120, . . . and 1n0.

The mobile communication management platform 300 may include a second list-transmitting module 330 and a second registration module 340. If a registration signal is received from the mobile communication device 400 through the second base station, the second list-transmitting module 330 provides service through the second base station 200 and transmits a second base station list, which includes information of the first base stations 110, 120, . . . and 1n0 and the second base station 200, to the mobile communication device 400. The second registration module 340 makes the mobile communication device 400 measure signal strength of the first base stations 110, 120, . . . and 1n0 and the second base station 200 according to the second base station list. Then, the second registration module 340 makes the mobile communication device 400 transmit another registration signal to a base station with the strongest measured signal strength among the first base stations 110, 120, . . . and 1n0 and the second base station 200. Therefore, if the mobile communication device 400 registers with the second base station 200, the mobile communication device can still obtain service.

To avoid the mobile communication device 400 from registering with a base station, which can't provide service due to over-loading, the mobile communication management platform 300 may include a loading-obtaining module 350 and a removing module 360. The loading-obtaining module 350 obtains loadings of the first base stations 110, 120, . . . and 1n0. Wherein, data transmission rate or user number of the first base stations 110, 120, . . . and 1n0 may be utilized as the loadings of the first base stations 110, 120, . . . and 1n0. The removing module 360 determines if there is at least one over-loaded base station, whose loading is over loading threshold, among the first base stations 110, 120, . . . and 1n0 before transmitting the first base station list to the mobile communication device 400. Wherein, the loading threshold may be set to the maximal loading which the first base stations 110, 120, . . . and 1n0 can provide. If there is the over-loaded base station, the removing module 360 removes information of the over-loaded base station from the first base station list, and then makes the first list-transmitting module 310 transmit the first base station list to the mobile communication device 400 after removal. Wherein the removing module 360 may remove information of the over-loaded base station for removal thereof. In addition, the removing module 360 may set the over-loaded base station as a barred cell to simulate the removal thereof. Therefore, the mobile communication device 400 would not register with a base station, which can't provide service for over-loading.

In addition, to make the mobile communication device 400 able to obtain service when the first base stations 110, 120, . . . and 1n0 are all over-loaded, the mobile communication management platform 300 may include a third registration module 370. The third registration module 370 determines if loadings of the first base stations 110, 120, . . . and 1n0 are all over the loading threshold before transmitting the first base station list to the mobile communication device 400. If loadings of the first base stations 110, 120, . . . and 1n0 are all over the loading threshold, the third registration module 370 makes the mobile communication device 400 transmit another registration signal to the second base station 200. Therefore, the mobile communication device can still obtain service when the first base stations 110, 120, . . . and 1n0 are all over-loaded.

To avoid that a few base stations provide most loading, the mobile communication management platform 300 may balance loading of the base stations. Therefore, the removing module 360 removes information of at least a base station with the largest loading from the first base station list before transmitting the first base station list to the mobile communication device 400. Then the removing module 360 makes the first list-transmitting module 310 transmit the first base station list to the mobile communication device after removal. Thus, the base stations with larger loading may not be registered, such that the base station with smaller loading may be registered. Then, loading of the first base stations 110, 120, . . . and 1n0 can be balanced.

In addition, if the mobile communication device 400 is in an idle status, the mobile communication management platform 300 can make the mobile communication device register with the base station with smaller loading to balance loading of the first base stations 110, 120, . . . and 1n0. Therefore, the mobile communication management platform 300 may include a status-determining module 380 and an idle-status module 390. The status-determining module 380 determines if the mobile communication device 400 is in the idle status. If the mobile communication device 400 is in the idle status, the idle-status module 390 obtains loadings of the first base stations 110, 120, . . . and 1n0. The idle-status module 390 filters several low-loading base stations, whose loadings are lower than loading of the first station receiving the registration signal respectively, from the first base stations 110, 120, . . . and 1n0. Then, the idle-status module 390 selects one of the low-loading base stations, and makes the mobile communication device 400 transmit another registration signal to the selected low-loading base station. Wherein, the idle-status module 390 may select the low-loading base station with the strongest signal strength or the lowest loading to be registered by the mobile communication device 400 in an idle status. In other embodiments, the idle-status module 390 may select one of the low-loading base stations according to parameters of the low-loading base stations, such as signal strength, loading or other base station related parameter, with different selection method, which should not be limited in this embodiment. Therefore, the mobile communication device 400 in the idle status may register with the first base station with lower loading, which can balance loading of the first base stations 110, 120, . . . and 1n0.

FIG. 2A-2D are flow diagrams of a mobile communication method according to another embodiment of this invention. In the mobile communication method, several first base stations with smaller coverage and at least a second base station with larger coverage are provided. When a mobile communication device registers with one of the first base stations, information of the first base stations are provided to the mobile communication device to measure signal strength of the first base stations and select a service provider for the mobile communication device from the first base stations. The mobile communication method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

Figure 2A:
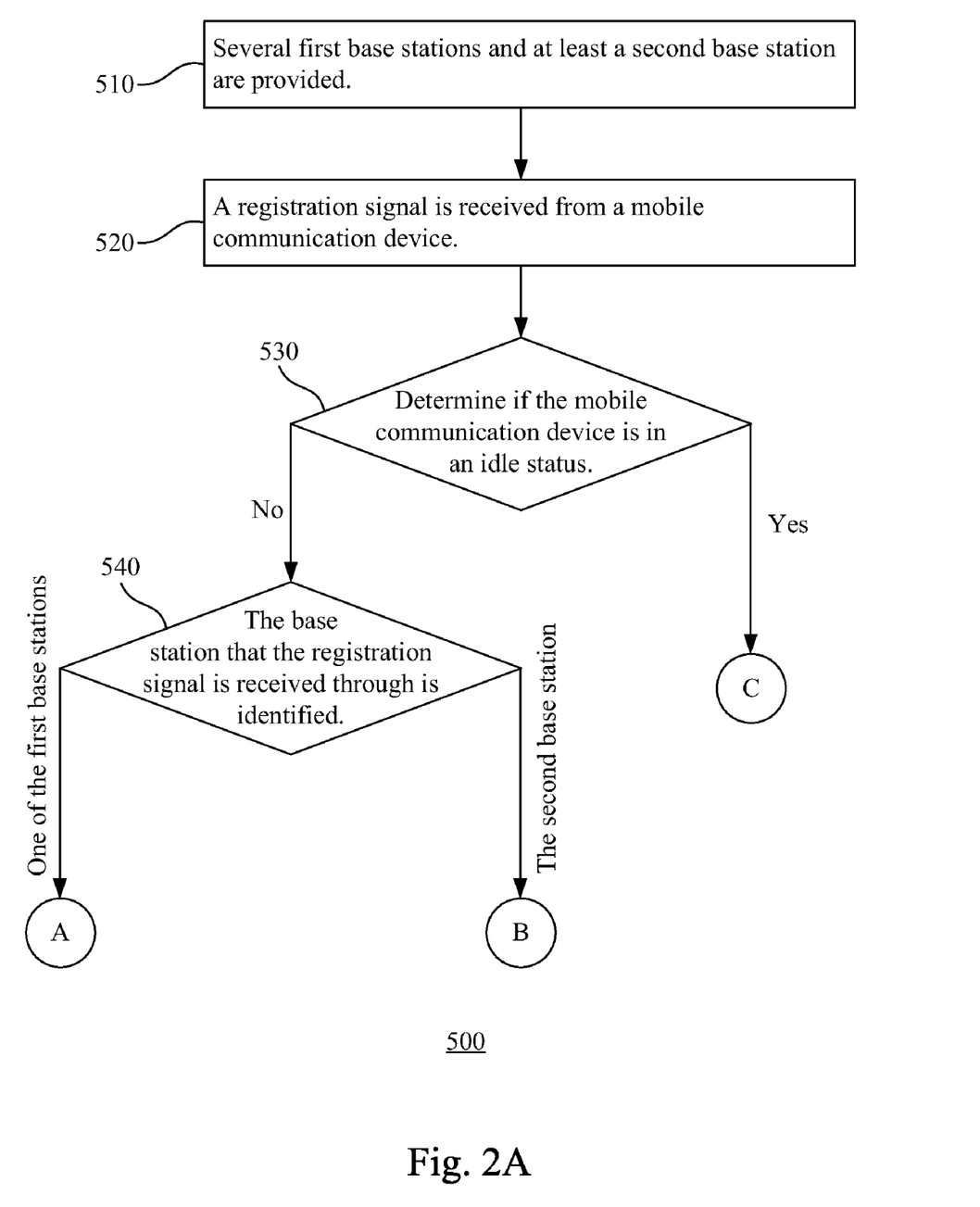
FIG. 2A-2D are flow diagrams of a mobile communication method according to one embodiment of this invention
Figure 2B:
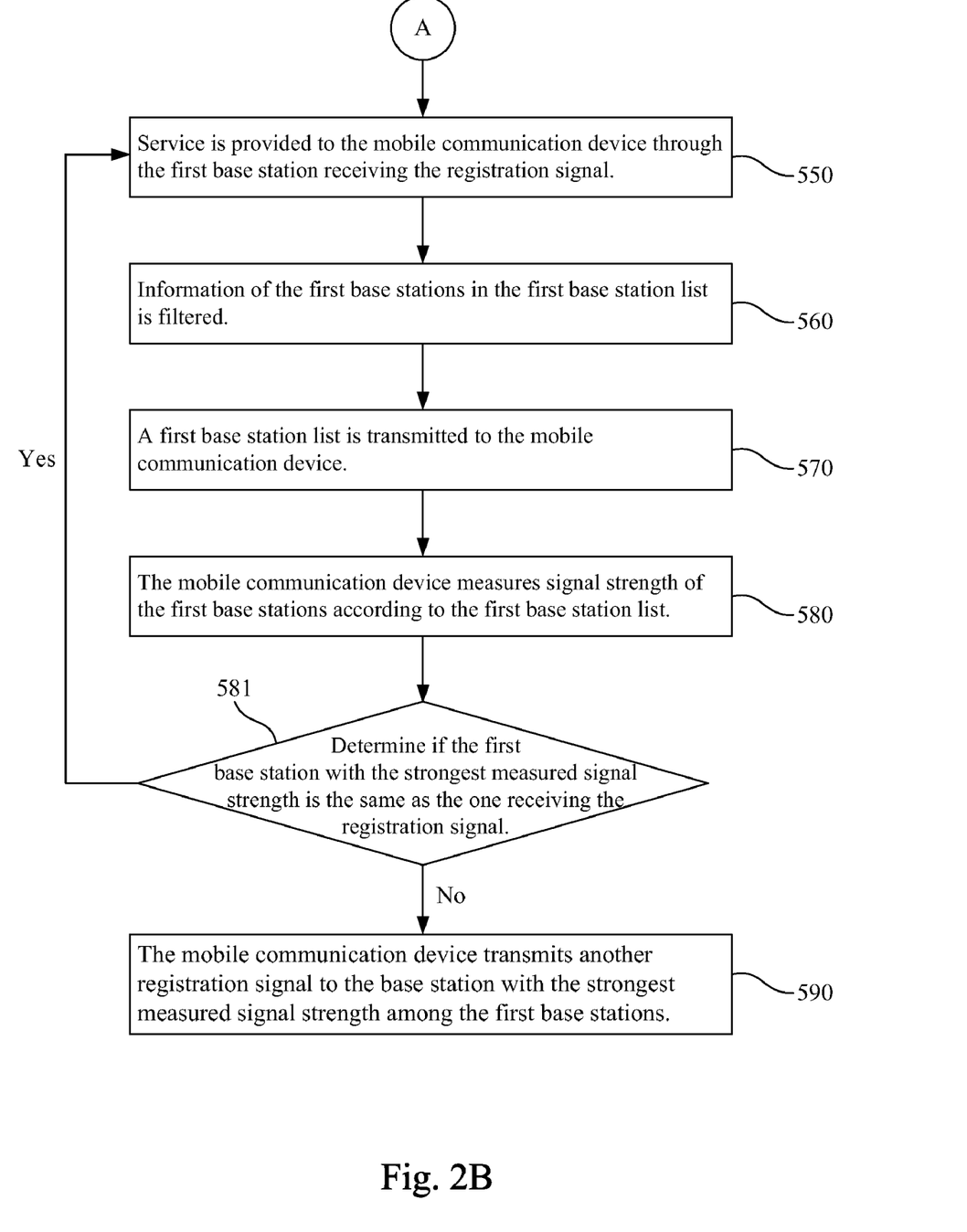

The mobile communication method 500 includes the following steps:

In step 510, several first base stations and at least a second base station are provided. Each of the first base stations can cover a smaller area than the second base station can. If the mobile communication method is implemented under $3^{rd}$ Generation (3G) network, the first base stations may be Femtocells, the second base station may be a Macrocell.

When a registration signal is received from a mobile communication device (step 520), the base station that the registration signal is received through is identified in step 540. In step 550, if the registration signal is received through one of the first base stations, service is provided to the mobile communication device through the first base station receiving the registration signal.

In step 570, a first base station list, which includes information of the first base stations, is transmitted to the mobile communication device. Wherein, the first base station list can be transmitted (step 570) utilizing SIB 11.

Before the first base station list is transmitted (step 570), information of the first base stations in the first base station list may be filtered (step 560). In one embodiment, the mobile communication method may avoid that the mobile communication device registers with a base station, which can't provide service due to over-loading, by filtering in step 560. Therefore, filtering in step 560 may include the following steps: loadings of the first base stations may be obtained. Then, determine if there is at least one over-loaded base station, whose loading is over loading threshold, among the first base stations. Wherein, the loading threshold may be set to the maximal loading which the first base stations can provide. If there is the over-loaded base station, removing information of the over-loaded base station from the first base station list for filtering information of the first base stations in the first base station list (step 560). Wherein information of the over-loaded base station may be remove for filtering in step 560. In addition, the over-loaded base station may be set as a barred cell to simulate the removal thereof for filtering in step 560.

Besides, the mobile communication method 500 may make the mobile communication device able to obtain service when the first base stations are all over-loaded utilizing filtering in step 560. Therefore, filtering in step 560 may include the following steps: determine if the loadings of the first base stations are all over loading threshold. If loadings of the first base stations are all over the loading threshold, making the mobile communication device transmit another registration signal to the second base station.

In another embodiment, the mobile communication method 500 may avoid that few base stations provide most loading. Therefore, filtering in step 560 may include the following steps: information of at least a base station with the largest loading is removed from the first base station list. Thus, the base stations with larger loading may not be registered, such that the base station with smaller loading may be registered. Then, loading of the first base stations can be balanced.

In step 580, the mobile communication device measures signal strength of the first base stations according to the first base station list. Then, in step 590, the mobile communication device transmits another registration signal to the first base station with the strongest measured signal strength to obtain service. Before step 590, determine if the first base station with the strongest measured signal strength is the same as the one receiving the registration signal in step 520 (step 581). If the first base station receiving the registration signal is the same as the base station with the strongest measured signal strength among the first base stations, the first station receiving the registration signal continually provides service to the mobile communication device (step 550). If the first base station receiving the registration signal is different from the base station with the strongest measured signal strength among the first base stations, the mobile communication device transmits another registration signal to the base station with the strongest measured signal strength among the first base stations (step 590). Therefore, the mobile communication device would not switch to the second base station easily once the mobile communication device register with one of the first base stations.

Figure 2C:
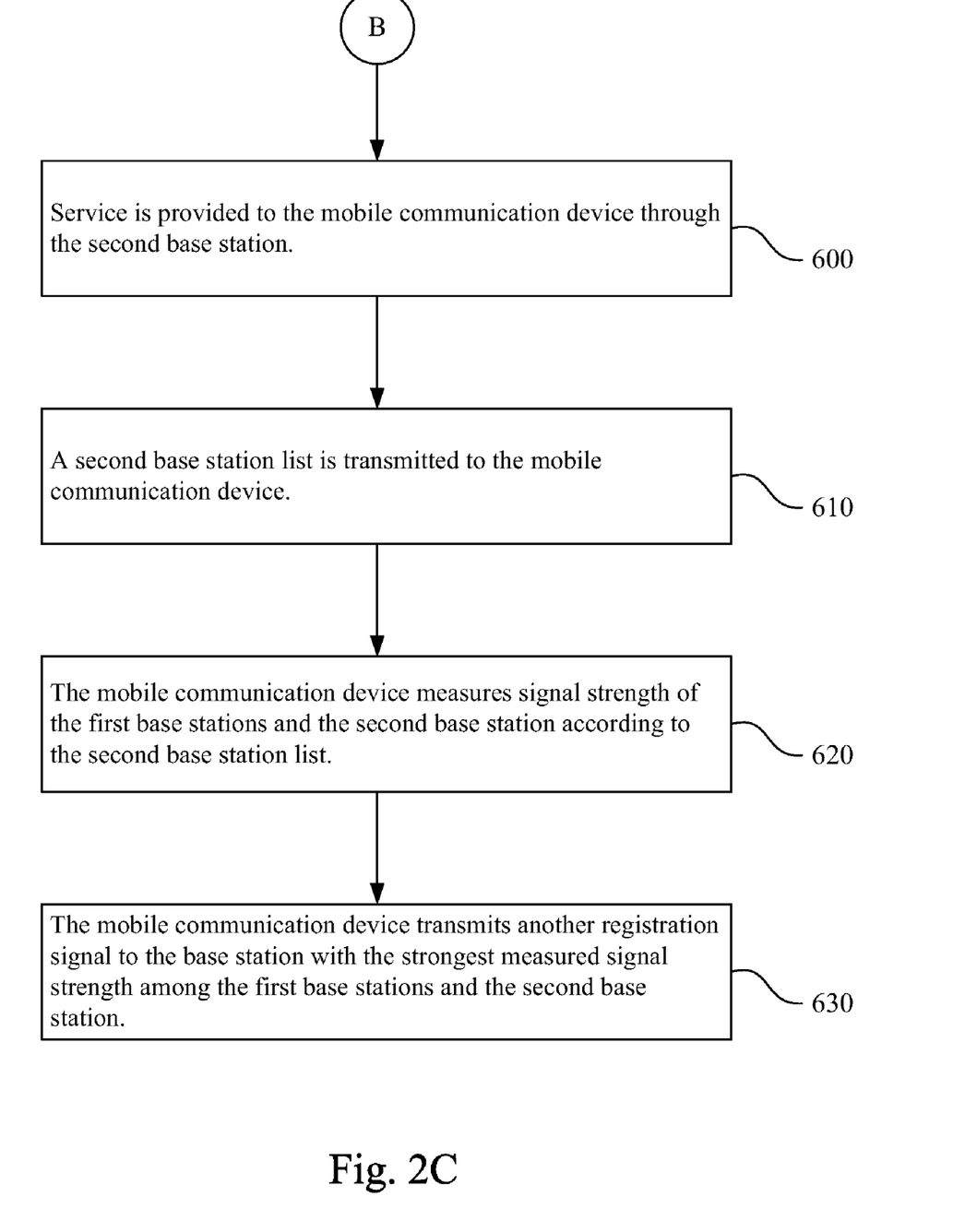

In step 600, if the registration signal is received through the second base station, service is provided to the mobile communication device through the second base station. In step 610, a second base station list is transmitted to the mobile communication device. Wherein, the second base station list includes information of the first base stations and the second base station.

In step 620, the mobile communication device measures signal strength of the first base stations and the second base stations according to the second base station list. In step 630, the mobile communication device transmits another registration signal to the base station with the strongest measured signal strength among the first base stations and the second base station. Therefore, if the mobile communication device registers with the second base station, the mobile communication device can still obtain service.

In addition, if the mobile communication device is in an idle status, the mobile communication method 500 can make the mobile communication device register with the base station with smaller loading to balance loading of the first base stations. Therefore, before step 540, determine if the mobile communication device is in an idle status (step 530). If the mobile communication device is not in the idle status, the base station the registration signal is received through is identified (step 540).

Figure 2D:
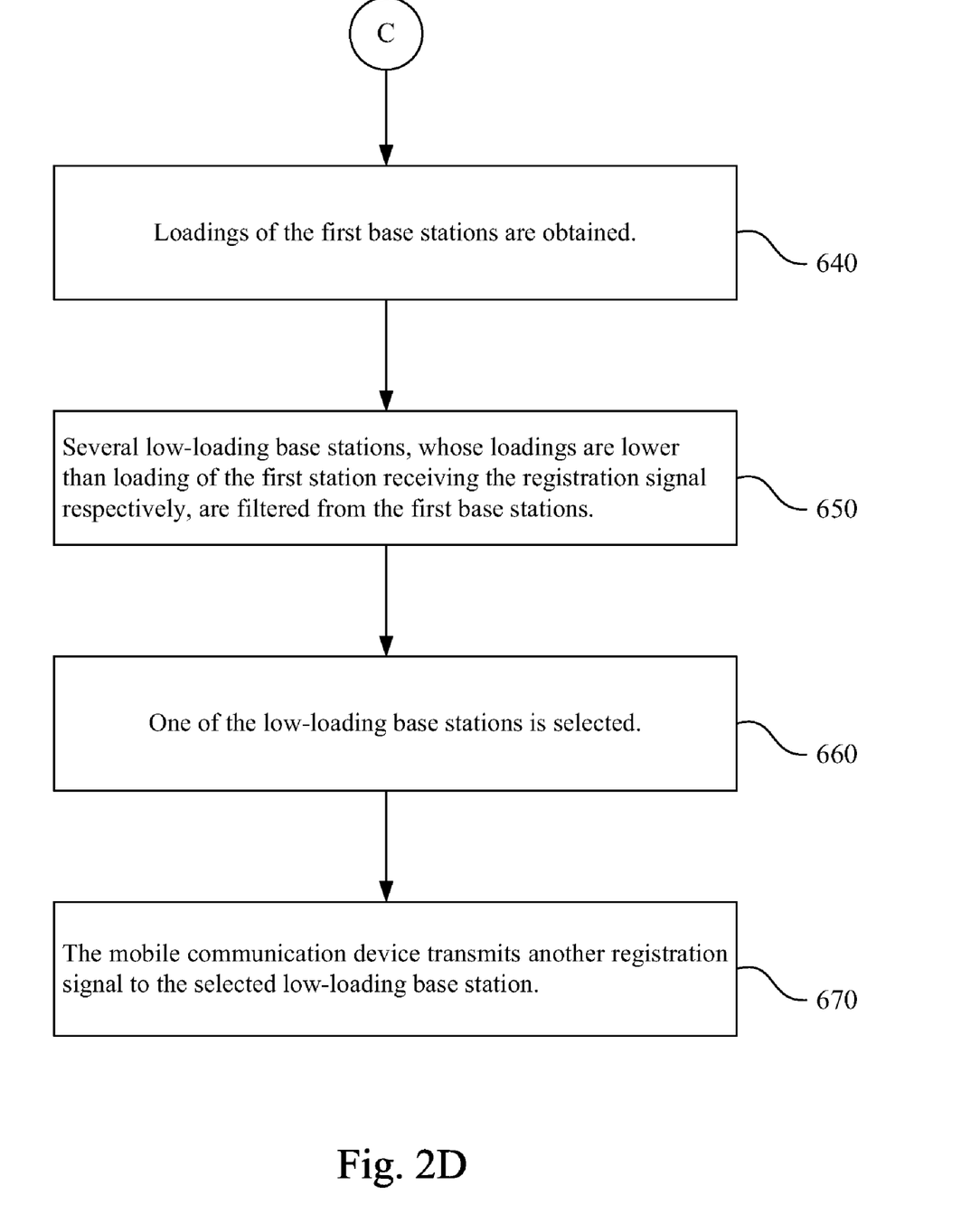

In step 640, if the mobile communication device is in the idle status, loadings of the first base stations are obtained.

In step 650, several low-loading base stations, whose loadings are lower than loading of the first station receiving the registration signal respectively, are filtered from the first base stations.

Then, one of the low-loading base stations is selected (step 660), and the mobile communication device transmits another registration signal to the selected low-loading base station (step 670). Wherein, the low-loading base station with the strongest signal strength or the lowest loading may be selected in step 670. In other embodiments, step 670 may utilize different selection methods to select one of the low-loading base stations according to parameters of the low-loading base stations, such as signal strength, loading or other base station related parameter, which should not be limited in this embodiment. Therefore, the mobile communication device in the idle status may register with the first base station with lower loading, which can balance loading of the first base stations.

Above all, when a mobile communication device register with one of the base stations with smaller coverage, a base station list including information of the base stations with smaller coverage but without information of the base station with larger coverage is provided to the mobile communication device. Therefore, the mobile communication device would not switch to the second base station easily once the mobile communication device register with one of the base stations with smaller coverage. When one embodiment of this invention is applied under 3G network, the mobile communication device may obtain service from one of the Femtocells, whose coverage is smaller than a Macrocell, once the mobile communication device register with one of the Femtocells. In addition, obtaining service from Femtocell charges less than obtaining service from Macrocell does. Therefore, cost for obtaining service can be saved. Besides, loading of the base stations can be balanced through one embodiment of this invention. Since information of over-loaded base stations may not be provided, power consumption of the mobile communication device for measuring signal strength of the over-load base stations, which can not provide service due to over-loaded, can be saved. Therefore, battery life of the mobile communication device can be extended.

Although the present invention has been described in considerable detail with reference to certain embodiments thereof, other embodiments are possible. Therefore, their spirit and scope of the appended claims should not be limited to the description of the embodiments container herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A mobile communication method, comprising:
providing a plurality of first base stations and at least one second base station, wherein each of the first base stations can cover a smaller area than the second base station can;
receiving a registration signal from a mobile communication device;
when the registration signal is received through one of the first base stations, providing service to the mobile communication device through the first base station receiving the registration signal, and transmitting a first base station list, which comprises information of the first base stations, to the mobile communication device;
making the mobile communication device measure signal strength of the first base stations according to the first base station list;
making the mobile communication device transmit another registration signal to the first base station with the strongest measured signal strength;
when the registration signal is received through the second base station, providing service through the second base station, and transmitting a second base station list, which comprises information of the first base stations and the second base station, to the mobile communication device;
making the mobile communication device measure signal strength of the first base stations and the second base station according to the second base station list;
making the mobile communication device transmit another registration signal to a base station with the strongest measured signal strength among the first base stations and the second base station;
obtaining loadings of the first base stations;
before transmitting the first base station list to the mobile communication device, determining if the loadings of the first base stations are all over loading threshold; and
when the loadings of the first base stations are all over the loading threshold, making the mobile communication device transmit another registration signal to the second base station.

2. The mobile communication method of claim 1, wherein the first base stations are Femtocells, and the second base station is a Macrocell.

3. The mobile communication method of claim 1, further comprising:
before transmitting the first base station list to the mobile communication device, determining if there is at least one over-loaded base station, whose loading is over the loading threshold, among the first base stations;

when there is at least one over-loaded base station, removing information of the over-loaded base station from the first base station list; and transmitting the first base station list to the mobile communication device after removal.

4. The mobile communication method of claim 1, further comprising:

before transmitting the first base station list to the mobile communication device, removing information of at least a base station with the largest loading from the first base station list; and transmitting the first base station list after remove to the mobile communication device.

5. The mobile communication method of claim 1, further comprising:

determining if the mobile communication device is in an idle status;

when the mobile communication device is in the idle status, filtering a plurality of low-loading base stations, whose loadings are lower than the loading of the first station receiving the registration signal respectively, from the first base stations; and selecting one of the low-loading base stations, and making the mobile communication device transmit another registration signal to the selected low-loading base station.

6. The mobile communication method of claim 1, wherein the first base station list is transmitted utilizing System Information Block (SIB) 11.

7. A mobile communication system, comprising:

a plurality of first base stations;

at least a second base station, wherein each of the first base stations can cover a smaller area than the second base station can; and a mobile communication management platform, building connections with the first base stations and the second base station respectively, comprising:

a first list-transmitting module, wherein if a registration signal is received from a mobile communication device through one of the first base stations, the first list-transmitting module provides service to the mobile communication device through the first base station receiving the registration signal, and transmits a first base station list, which comprises information of the first base stations, to the mobile communication device;

a first registration module, making the mobile communication device measure signal strength of the first base stations according to the first base station list, and making the mobile communication device transmit another registration signal to the first base station with the strongest measured signal strength;

a second list-transmitting module, wherein when the registration signal is received through the second base station, the second list-transmitting module provides service through the second base station and transmits a second base station list, which comprises information of the first base stations and the second base station, to the mobile communication device;

a second registration module, making the mobile communication device measure signal strength of the first base stations and the second base station according to the second base station list, and making the mobile communication device transmit another registration signal to a base station with the strongest measured signal strength among the first base stations and the second base station;

a loading-obtaining module, obtaining loadings of the first base stations; and a third registration module, determining if the loadings of the first base stations are all over loading threshold before transmitting the first base station list to the mobile communication device, wherein when the loadings of the first base stations are all over the loading threshold, the third registration module makes the mobile communication device transmit another registration signal to the second base station.

8. The mobile communication system of claim 7, wherein the first base stations are Femtocells, and the second base station is a Macrocell.

9. The mobile communication system of claim 7, wherein the mobile communication management platform further comprises:

a removing module, determining if there is at least one over-loaded base station, whose loading is over the loading threshold, among the first base stations before transmitting the first base station list to the mobile communication device, wherein when there is the over-loaded base station, the removing module removes information of the over-loaded base station from the first base station list, and then makes the first list-transmitting module transmit the first base station list to the mobile communication device.

10. The mobile communication system of claim 7, wherein the mobile communication management platform further comprises:

a removing module, removing information of at least a base station with the largest loading from the first base station list before transmitting the first base station list to the mobile communication device, and then making the first list-transmitting module transmit the first base station list to the mobile communication device.

11. The mobile communication system of claim 7, wherein the mobile communication management platform further comprises:

a status-determining module, determining if the mobile communication device is in an idle status;

an idle-status module, wherein when the mobile communication device is in the idle status, the idle-status module filters a plurality of low-loading base stations, whose loadings are lower than loading of the first station receiving the registration signal respectively, from the first base stations, selecting one of the low-loading base stations, and making the mobile communication device transmit another registration signal to the selected low-loading base station.

12. The mobile communication system of claim 7, wherein the first list-transmitting module transmits the first base station list utilizing SIB 11.

13. A non-transitory storage medium to store a plurality of instructions to execute a mobile communication method, wherein the mobile communication method comprises:

providing a plurality of first base stations (BS) and at least one second base station, wherein each of the first base stations can cover a smaller area than the second base station can;

receiving a registration signal from a mobile communication device;

when the registration signal is received through one of the first base stations, providing service to the mobile communication device through the first base station receiving the registration signal, and transmitting a first base station list, which comprises information of the first base stations, to the mobile communication device;

making the mobile communication device measure signal strength of the first base stations according to the first base station list;

making the mobile communication device transmit another registration signal to the first base station with the strongest measured signal strength;

when the registration signal is received through the second base station, providing service through the second base station, and transmitting a second base station list, which comprises information of the first base stations and the second base station, to the mobile communication device;

making the mobile communication device measure signal strength of the first base stations and the second base station according to the second base station list;

making the mobile communication device transmit another registration signal to a base station with the strongest measured signal strength among the first base stations and the second base station;

obtaining loadings of the first base stations;

before transmitting the first base station list to the mobile communication device, determining if the loadings of the first base stations are all over loading threshold; and when the loadings of the first base stations are all over the loading threshold, making the mobile communication device transmit another registration signal to the second base station.

14. The non-transitory storage medium of claim 13, wherein the first base stations are Femtocells, and the second base station is a Macrocell.

15. The non-transitory storage medium of claim 13, wherein the mobile communication method further comprises:

before transmitting the first base station list to the mobile communication device, determining if there is at least one over-loaded base station, whose loading is over the loading threshold, among the first base stations;

when there is an over-loaded base station, removing information of the over-loaded base station from the first base station list; and transmitting the first base station list after removal to the mobile communication device.

16. The non-transitory storage medium of claim 13, wherein the mobile communication method further comprises:

before transmitting the first base station list to the mobile communication device, removing information of at least a base station with the largest loading from the first base station list; and transmitting the first base station list after remove to the mobile communication device.

17. The non-transitory storage medium of claim 13, wherein the mobile communication method further comprises:

determining if the mobile communication device is in an idle status;

when the mobile communication device is in the idle status, filtering a plurality of low-loading base stations, whose loadings are lower than the loading of the first station receiving the registration signal respectively, from the first base stations; and selecting one of the low-loading base stations, and making the mobile communication device transmit another registration signal to the selected low-loading base station.

18. The non-transitory storage medium of claim 13, wherein the first base station list is transmitted utilizing SIB 11.

* * * * *